US006358029B1

(12) United States Patent
Niimi

(10) Patent No.: US 6,358,029 B1
(45) Date of Patent: Mar. 19, 2002

(54) METAL MOLD AND PRESS DEVICE

(75) Inventor: Nikichi Niimi, Anjou (JP)

(73) Assignee: Yuugen Kaisha Nimitekkou, Anjou (JP)

( * ) Notice: Subject to any disclaimer, the term of this patent is extended or adjusted under 35 U.S.C. 154(b) by 0 days.

(21) Appl. No.: 09/424,516

(22) PCT Filed: Apr. 5, 1999

(86) PCT No.: PCT/JP99/01805

§ 371 Date: Nov. 23, 1999

§ 102(e) Date: Nov. 23, 1999

(87) PCT Pub. No.: WO99/51409

PCT Pub. Date: Oct. 14, 1999

(30) Foreign Application Priority Data

| | | |
|---|---|---|
| Apr. 7, 1998 | (JP) | 10-112737 |
| Oct. 16, 1998 | (JP) | 10-313970 |
| Dec. 29, 1998 | (JP) | 10-377266 |

(51) Int. Cl.[7] .......... B29C 47/94
(52) U.S. Cl. .......... 425/107; 425/155; 425/DIG. 115
(58) Field of Search .......... 425/155, 107, 425/DIG. 115

(56) References Cited

U.S. PATENT DOCUMENTS

| | | | | |
|---|---|---|---|---|
| 1,328,308 A | * | 1/1920 | Van Houten, Jr. | 193/2 R |
| 1,780,629 A | * | 11/1930 | Otto | 425/107 |
| 3,799,199 A | * | 3/1974 | Rumpff | 137/625.4 |
| 3,837,199 A | * | 9/1974 | Larsonneur | 72/12.5 |
| 4,279,517 A | * | 7/1981 | Wallner et al. | 366/159.1 |
| 4,902,212 A | * | 2/1990 | Nakamura et al. | 425/107 |
| 5,229,139 A | * | 7/1993 | Haupt | 425/107 |
| 5,624,693 A | * | 4/1997 | Horling et al. | 425/146 |
| 5,746,676 A | * | 5/1998 | Kawase et al. | 476/50 |
| 5,829,401 A | * | 11/1998 | Masuda | 123/179.25 |
| 6,179,597 B1 | * | 1/2001 | Ito et al. | 425/107 |

FOREIGN PATENT DOCUMENTS

| | | |
|---|---|---|
| JP | 48-61898 | 8/1973 |
| JP | 48-84074 | 11/1973 |
| JP | 53-92826 | 8/1978 |
| JP | 57-56111 | 4/1982 |
| JP | 61-64409 | 4/1986 |
| JP | 5-5408 | 1/1993 |
| JP | 7-26094 | 5/1995 |
| JP | 09225695 A | 9/1997 |

* cited by examiner

*Primary Examiner*—Nam Nguyen
*Assistant Examiner*—Emmanuel Luk
(74) *Attorney, Agent, or Firm*—Beyer Weaver & Thomas, LLP

(57) ABSTRACT

Engaging surfaces for engaging with each other during a pressing operation and a pressing surface are provided in a mold that is composed of an upper mold part and a lower mold part. A guide channel is formed in the engaging surface provided by an inner surface of a side wall. When the upper mold part and the lower mold part engage with each other, the guide channel is covered by the engaging surface of the lower mold part to form a tunnel like passage. Lubricant that is introduced from a first aperture is recovered from a second aperture through the guide channel. Part of the lubricant that flows through the guide channel is supplied to the engaging surfaces.

15 Claims, 7 Drawing Sheets

Fig. 3
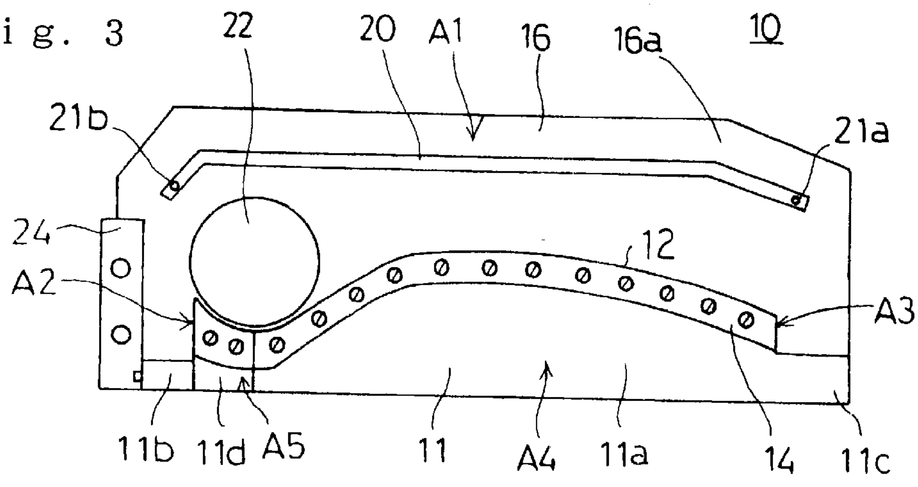
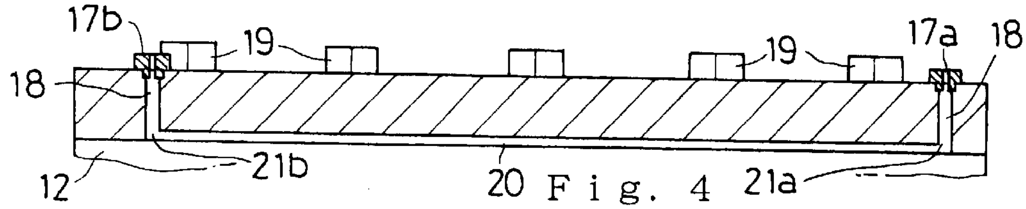
Fig. 4
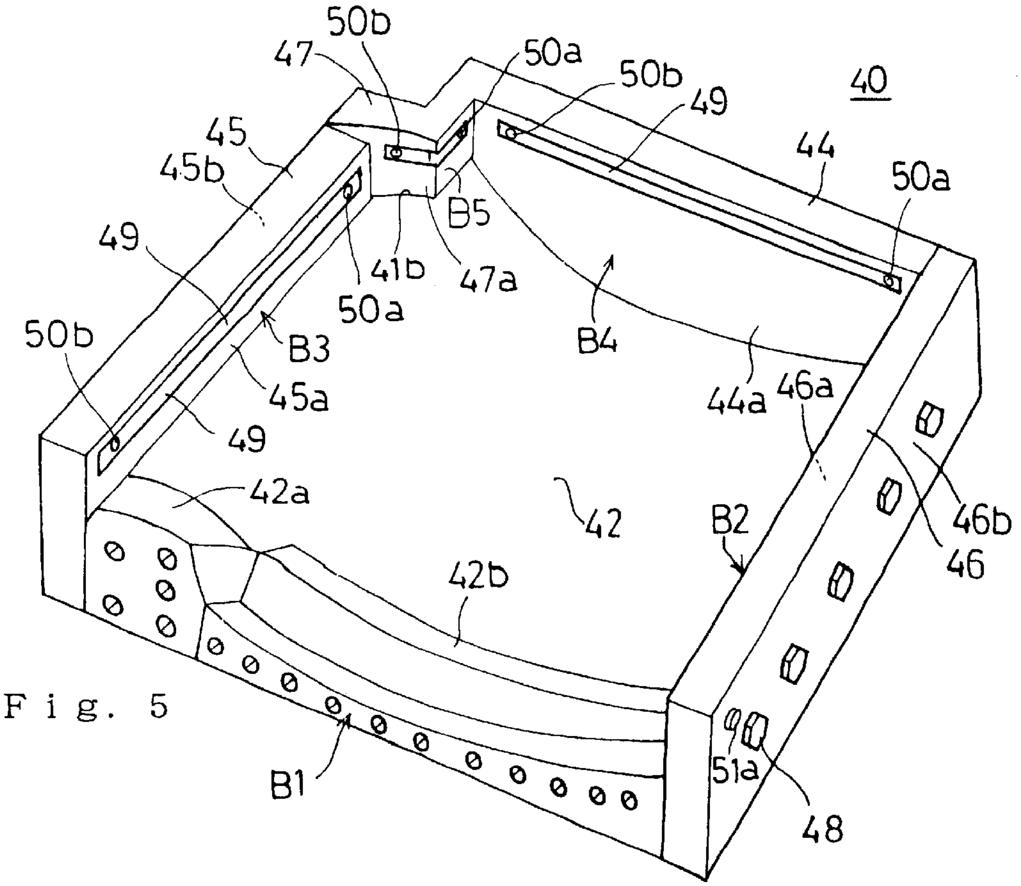
Fig. 5

METAL MOLD AND PRESS DEVICE

TECHNICAL FIELD

This invention relates to a mold and a pressing apparatus having the mold for conducting press molding of molding material.

BACKGROUND OF THE INVENTION

A mold is generally composed of a plurality of mold parts and is mounted in a pressing apparatus for use. The pressing apparatus presses molding material positioned between the mold parts to produce molded products. One example of such mold is a roof tile mold for molding roof tiles. In a case of the roof tile mold, a preform (roof tile clay material that is cut into a quadrate shape approximately corresponding to a shape of the roof tile) is first placed onto a lower mold part and is then pressed by an upper mold part. The pressed preform is deformed in conformity with an internal shape of the mold, or a shape of a cavity defined between the upper and lower mold parts, to produce a raw roof tile with a desired shape.

Engaging surfaces are provided in upper and lower mold parts for engaging with other engaging surface of opposite mold part to prevent egress of the deformed clay from the cavity during the pressing operation. When such mold is used for a long period of time, the engaging surfaces are worn out due to friction between the engaging surfaces. Especially, in a case of the roof tile mold, when the clay adheres to the engaging surfaces, the wearing process of the engaging surfaces is accelerated, and the engaging surfaces could be damaged by the clay particles. Furthermore, due to water contained in the clay, the engaging surfaces may rust, promoting the wearing process of the engaging surfaces.

An apparatus that restricts such wearing is disclosed in unexamined Japanese utility model publication No. 5-5408. The apparatus is a tile molding apparatus, wherein lubricating oil is sprayed near the engaging surfaces of the upper and lower mold parts.

However, such spraying of the lubricating oil cannot provide the sufficient amount of the lubricating oil to the entire engaging surfaces and inconveniently supplies the lubricating oil to portions where the lubricating oil is not needed, resulting in waste of the lubricating oil. Furthermore, even if the lubricating oil is successfully supplied to the engaging surfaces, the lubricating oil will be excessively supplied to the engaging surfaces, wasting the lubricating oil. Also, it is waste of the lubricating oil to supply the lubricating oil at each pressing operation.

Therefore, it is a primary objective of the present invention to provide a mold and a pressing apparatus capable of restricting the wearing of engaging surfaces.

SUMMARY OF THE INVENTION

To fulfill the above objective, the present invention provides a mold comprising first and second mold parts, wherein the first and second mold parts respectively have an engaging surface for engaging with each other during a pressing operation of molding material and a pressing surface for pressing the molding material, the mold being characterized by a lubricant supplying element that is formed in the engaging surface(s) of at least one of the first and second mold parts for supplying lubricant to the engaging surface(s), a first communicating passage that is formed in at least one of the first and second mold parts and is communicated with the lubricant supplying element, an inlet opening that is formed in an outer surface(s) of the mold part(s) having the first communicating passage for supplying the lubricant to the lubricant supplying element through the first communicating passage, a second communicating passage that is formed in at least one of the first and second mold parts and is communicated with the lubricant supplying element, and an outlet opening that is formed in an outer surface(s) of the mold part(s) having the second communicating passage for discharging the lubricant from the mold through the second communicating passage.

Furthermore, the present invention provides a mold comprising first and second mold parts, wherein the first and second mold parts respectively have an engaging surface for engaging with each other during a pressing operation of molding material and a pressing surface for pressing the molding material, the mold being characterized by a lubricant supplying channel that is formed in the engaging surface of the first or second mold part for supplying lubricant to the engaging surface, a first communicating passage that is formed in the first or second mold part and is communicated with the channel, an inlet opening that is formed in an outer surface of the mold part having the first communicating passage for supplying the lubricant to the channel through the first communicating passage, a second communicating passage that is formed in the first or second mold part and is communicated with the channel, and an outlet opening that is formed in an outer surface of the mold part having the second communicating passage for discharging the lubricant from the mold through the second communicating passage.

Also, to fulfill the above objective, the present invention provides a pressing apparatus including a mold comprising first and second mold parts, wherein the first and second mold parts respectively have an engaging surface for engaging with each other during a pressing operation of molding material and a pressing surface for pressing the molding material, a pressing means for holding the first and second mold parts of the mold and pressing the molding material that is disposed between the first and second mold parts by moving the first and second mold parts toward each other, and a counting means for counting the number of the pressing operations, the pressing apparatus being characterized by a lubricant supplying element that is formed in the engaging surface(s) of at least one of the first and second mold parts for supplying lubricant to the engaging surface (s), a first communicating passage that is formed in at least one of the first and second mold parts and is communicated with the lubricant supplying element, an inlet opening that is formed in an outer surface(s) of the mold part(s) having the first communicating passage for supplying the lubricant to the lubricant supplying element through the first communicating passage, a supplying device for supplying the lubricant to the inlet opening, and a control means for operating the supplying device based on a predetermined count of the counting means and a predetermined timing.

Furthermore, the present invention provides a pressing apparatus including a mold comprising first and second mold parts, wherein the first and second mold parts respectively have an engaging surface for engaging with each other during a pressing operation of molding material and a pressing surface for pressing the molding material, a pressing means for holding the first and second mold parts of the mold and pressing the molding material that is disposed between the first and second mold parts by moving the first and second mold parts toward each other, and a counting means for counting the number of the pressing operations, the pressing apparatus being characterized by a lubricant supplying channel that is formed in the engaging surface of the first or second mold part for supplying lubricant to the engaging surface, a first communicating passage that is formed in the first or second mold part and is communicated with the channel, an inlet opening that is formed in an outer surface of the mold part having the first communicating passage for supplying the lubricant to the channel through the first communicating passage, a second communicating passage that is formed in the first or second mold part and is communicated with the channel, an outlet opening that is formed in an outer surface of the mold part having the second communicating passage for discharging the lubricant from the mold through the second communicating passage, a supplying device for supplying the lubricant to the inlet opening, and a control means for operating the supplying device based on a predetermined count of the counting means and a predetermined timing.

BRIEF DESCRIPTION OF DRAWINGS

FIG. 3 is a frontal view of the same upper mold part.

FIG. 4 is a cross-sectional view of a side wall of the same upper mold part.

FIG. 5 is a perspective view of a lower mold part of the mold according to the embodiment of the present invention.

DETAILED DESCRIPTION OF THE PREFERRED EMBODIMENTS

As shown in FIGS. 1 to 5, a mold for molding eave end roof tiles includes an upper mold part 10 acting as the first mold part and a lower mold part 40 acting as the second mold part. The upper mold part 10 will be first described.

Figure 1:
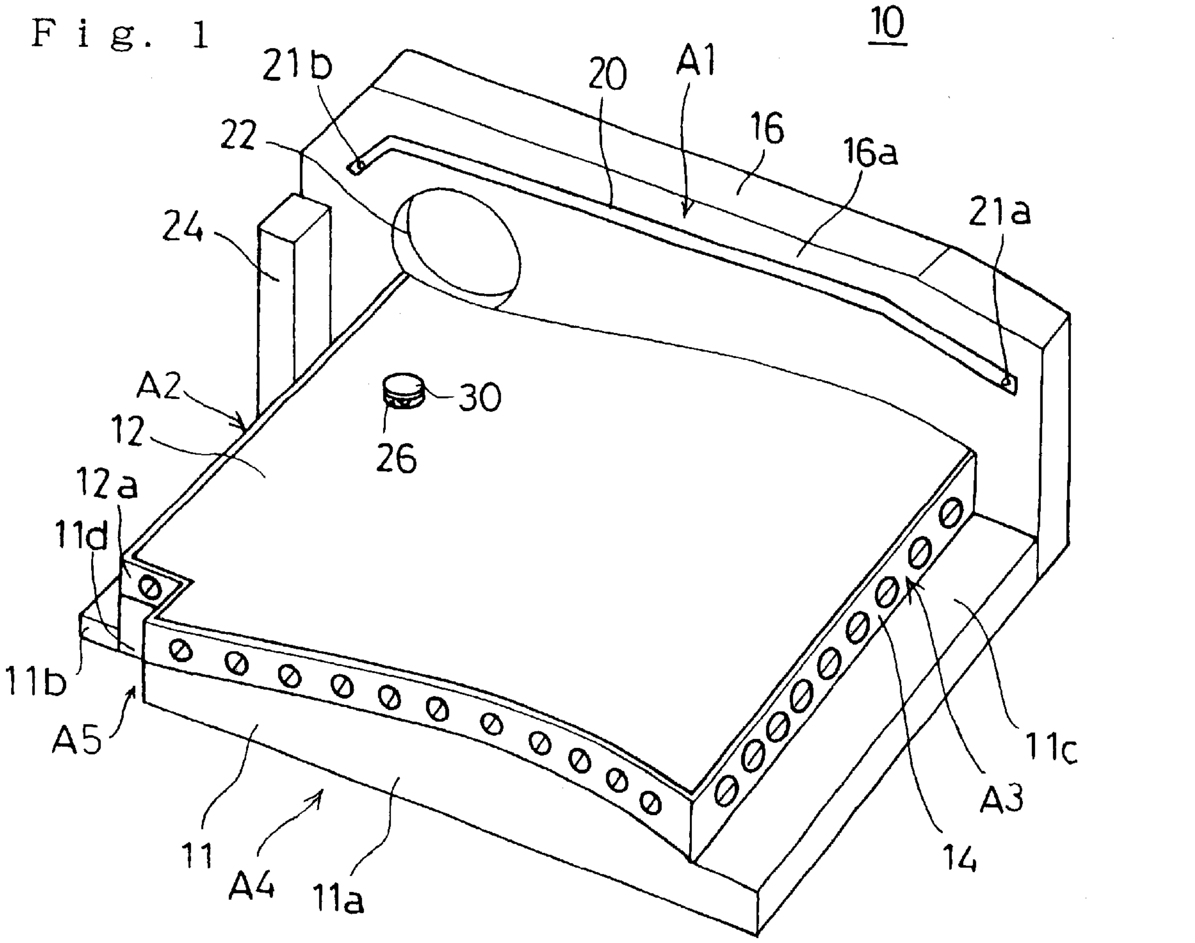
FIG. 1 is a perspective view of an upper mold part of a mold according to one embodiment of the present invention.

As shown in FIGS. 1 and 3, the upper mold part 10 has a first base 11. The first base 11 includes a thick section 11*a* and first and second extensions 11*b*, 11*c*, which are respectively formed at the left and right sides of the thick section 11*a*. The first base 11 is substantially square shaped. A notch forming section 11*d* is provided at one corner of the first base 11. The notch forming section 11*d* forms a notch 2 of the eave end roof tile 1 of FIG. 11. In FIG. 1, a top surface (inner side of the mold) of the thick section 11*a* constitutes a pressing surface 12 that contacts a preform of the eave end roof tile 1. As shown in FIG. 3, the pressing surface 12 is curved to form a wavy surface to which the pressed preform is conformed for producing a wavy contour of the molded raw eave end roof tile. The contour of the pressing surface 12 conforms with the contour of the roof tile.

Again, as shown in FIG. 1, a belt 14 extends along three sides of the pressing surface 12.

Figure 2:
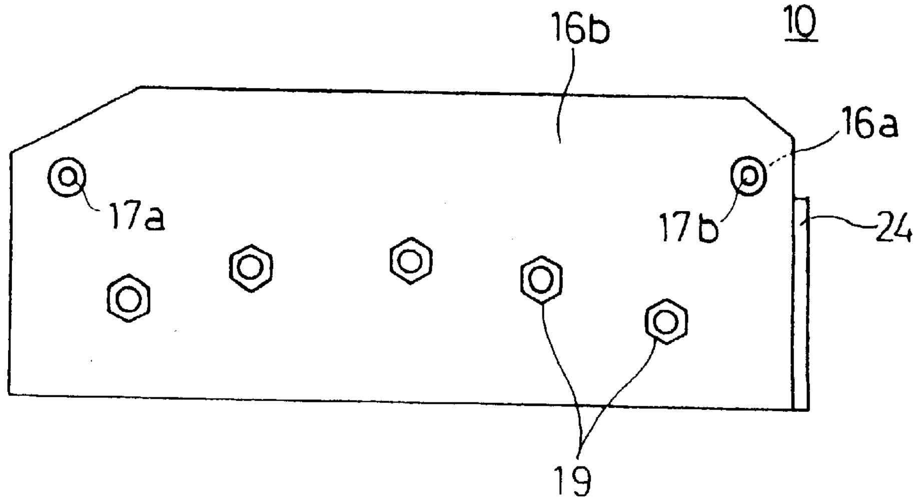
FIG. 2 is a rear view of the same upper mold part.

As shown in FIGS. 1 and 2, a side wall 16 is provided at the rear side (at the depth side of FIG. 1) of the first base 11. The side wall 16 is fixed to the first base 11 by hexagon head bolts 19. As shown in FIG. 4, there is a pair of communicating passages 18 that extend through the side wall 16. As shown in FIGS. 1, 3 and 4, a guide channel 20 acting as the lubricant supplying element is formed in an inner surface 16*a* of the side wall 16. The guide channel 20 extends in a horizontal direction near the top edge of the side wall 16. The guide channel 20 has a U-shaped cross section. First and second apertures 21*a*, 21*b* acting as the lubricant supplying elements are respectively formed at opposing ends of the guide channel 20. An inlet opening 17*a* for feeding lubricating oil is formed in opposed relation to the first aperture 21*a* in an outer surface 16*b* of the side wall 16. The first aperture 21*a* and the inlet opening 17*a* are interconnected via one communicating passage 18. A recovery opening (or an outlet opening) 17*b* for recovering the lubricating oil from the mold is provided in opposed relation to the second aperture 21*b*. The second aperture 21*b* and the recovery opening 17*b* are interconnected via other communicating passage 18.

Figure 11:
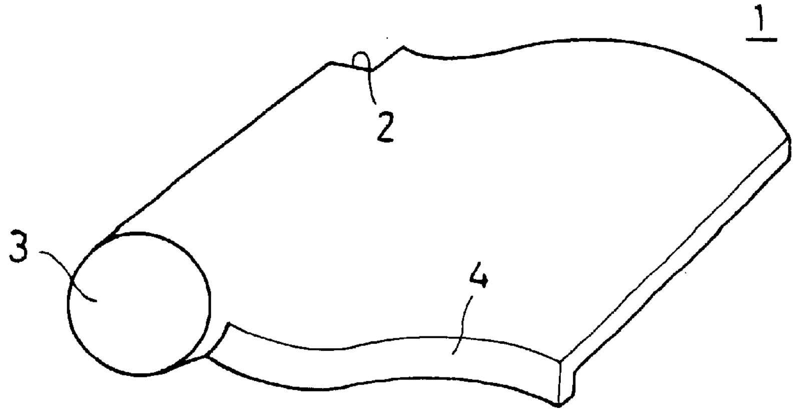
FIG. 11 is a perspective view of a molded eave end roof tile.

A cylindrical recess 22 for forming a lug 3 with a circular cross-section of the eave end roof tile 1 of FIG. 11 is arranged at one side (at the left side in FIG. 3) of the inner surface 16*a*. As shown in FIGS. 1 and 3, a guide 24 is secured to the inner surface 16*a* adjacent to the first extension 11*b*.

As shown in FIGS. 1 and 3, the inner surface 16*a* constitutes a first engaging surface A1. A side surface of the belt 14 and a wall surface of the thick section 11*a* of the first base 11, which are located adjacent to the first extension 11*b*, constitute a second engaging surface A2. Opposite side surface of the belt 14 that is adjacent to the second extension 11*c* constitutes a third engaging surface A3. A frontal side surface of the belt 14 and a frontal wall surface of the thick section 11*a*, which are located at the frontal side of FIG. 1, constitute a fourth engaging surface A4. A notched surface of the notch forming section 11*d* constitutes a fifth engaging surface A5.

Figure 12:
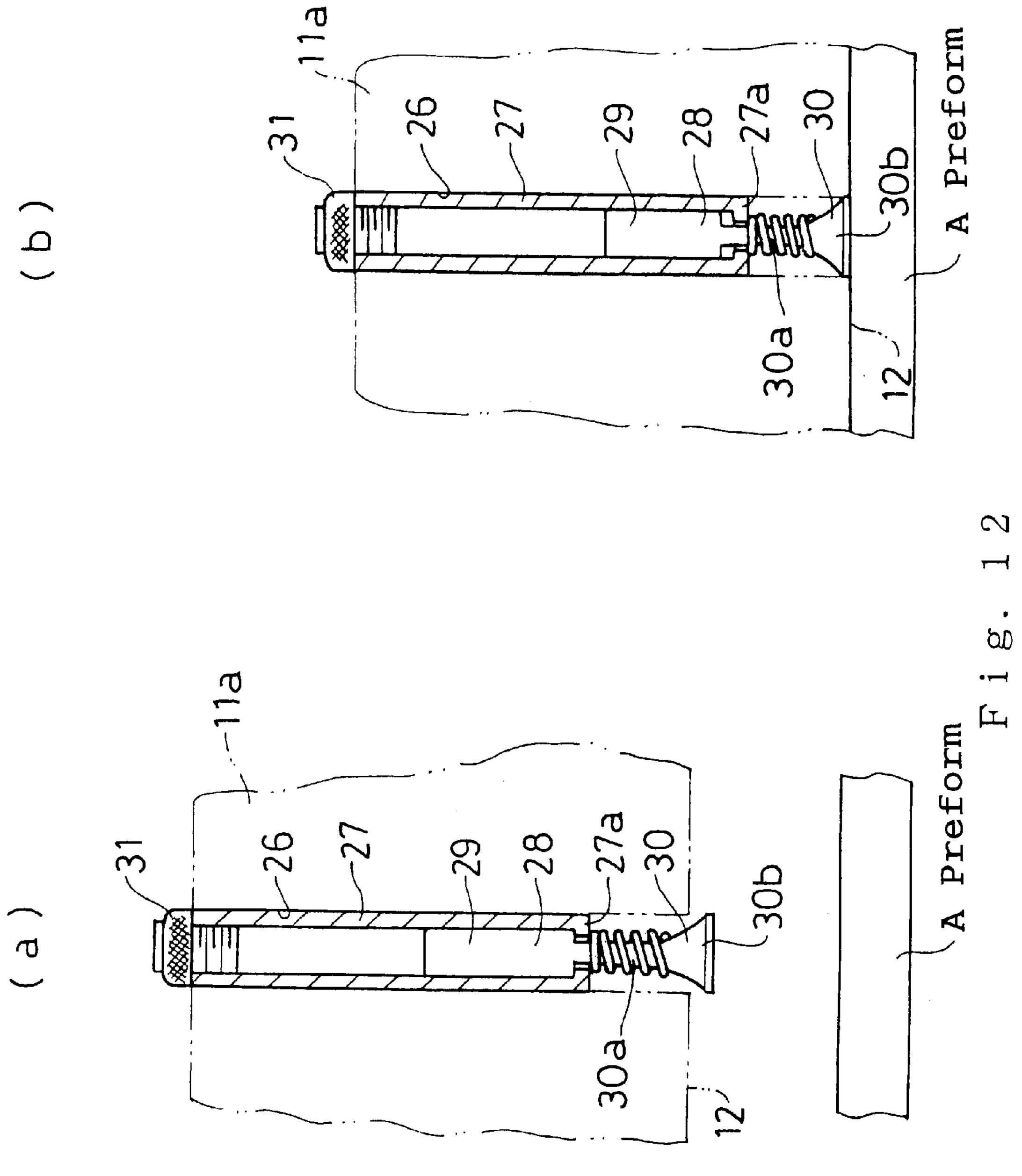
FIG. 12 is a descriptive view of a poppet, which is arranged in a cylindrical housing that is inserted in a communicating hole, wherein (a) is a view of the poppet before it engages the preform, and (b) is a view of the poppet during engagement with the preform.

As shown in FIGS. 1, 12(*a*) and 12(*b*), a communicating hole 26 extends through the thick section 11*a* from the pressing surface 12 to the back surface of the thick section 11*a*. A cylindrical housing 27, in which a poppet 28 is slidably received, is placed in the communicating hole 26. As shown in FIG. 12(*a*), the poppet 28 includes a body 29 and a head 30. A coil spring 29 is arranged around a small diameter portion 30*a* of the head 30 between a flange 27*a* of the cylindrical housing 27 and a large diameter portion 30*b* of the head 30 for urging the poppet 28 toward the pressing surface 12. The distal end of the large diameter portion 30*b* protrudes from the pressing surface 12, as shown in FIG. 12(*a*). A connector 31 is threadably connected to the rear end of the cylindrical housing 27.

A lower mold part 40 will now be described. As shown in FIG. 5, a second base 41 is provided in the lower mold part 40. The second base 41 is substantially square shaped. A pressing surface 42 is provided on the top of the second base 41. The pressing surface 42 is curved to form a wavy surface to which the pressed preform is conformed for producing the molded raw roof tile. A part of the pressing surface 42 (at the front side in FIG. 5) is formed with separate blocks 42*a*, 42*b* for molding the lug 3 and a eave end side 4 of the roof tile of FIG. 11, respectively.

Three side walls 44–46 are respectively provided at three sides (three sides except front side in FIG. 5) of the second base 41. The side walls 44–46 are fixed to the second base 41 by hexagon head bolts 48.

Figure 6:
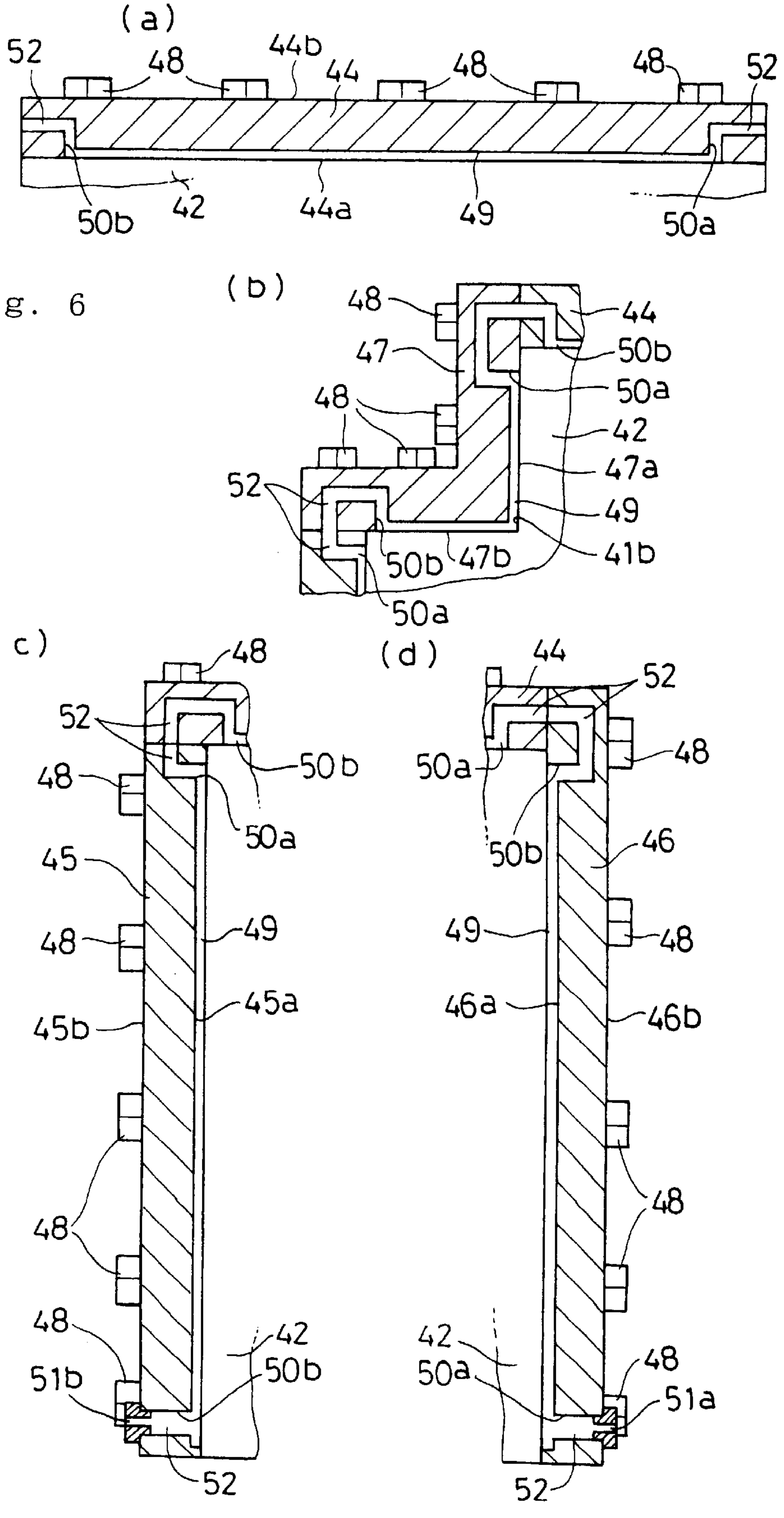
FIG. 6 is a cross-sectional view of the same lower mold part, wherein (a) is a cross-sectional view of a first side wall of the lower mold part, (b) is a cross-sectional view of a notch forming side wall of the lower mold part, (c) is a cross-sectional view of a second side wall of the lower mold part, and (d) is a cross-sectional view of a third side wall of the lower mold part.

As shown in FIGS. 5 and 6(*a*), a guide channel 49 is formed in an inner surface 44*a* of the first side wall 44 (at the depth side in FIG. 5). The guide channel 49 extends in a lateral direction near the top edge of the first side wall 44. The guide channel 49 has a U-shaped cross section. First and second apertures 50*a*, 50*b* acting as the lubricant supplying elements are formed at opposing ends of the guide channel 49.

As shown in FIGS. 5, 6(*c*) and 6(*d*), a guide channel 49 acting as the lubricant supplying element is also formed in inner surfaces 45*a*, 46*a* of the second and third side walls 45, 46. First and second apertures 50*a*, 50*b* are respectively formed at opposing ends of each guide channel 49. An inlet opening 51*a* that corresponds with the first aperture 50*a* is formed in an outer surface 46*b* of the third side wall 46, and a recovery opening (or an outlet opening) 51*b* that corresponds with the second aperture 50*b* is formed in an outer surface 45*b* of the second side wall 45.

As shown in FIGS. 5 and 6(*b*), a notch forming side wall 47 is fixed by the hexagon head bolts 48. The notch forming side wall 47 is used to form the notch 2 of the roof tile 1 of FIG. 11. A guide channel 49 acting as the lubricant supplying element is also formed in an inner surface 47*a* of the notch forming side wall 47. The guide channel 49 extends in a horizontal direction near the top edge of the notch forming side wall 47. The inner surface 47*a* of the notch forming side wall 47 is bent 90 degrees to form the notch 2. Therefore, the guide channel 49 is also bent 90 degrees to conform with the inner surface 47*a*. The guide channel 49 has a U-shaped cross section. First and second apertures 50*a*, 50*b* are respectively formed at opposing ends of the guide channel 49.

As shown in FIGS. 6(*a*) and 6(*d*), the first aperture 50*a* of the guide channel 49 of the first side wall 44 is communicated with the second aperture 50*b* of the guide channel 49 of the third side wall 46 via a communicating passage 52. As shown in FIGS. 6(*a*) and 6(*b*), the second aperture 50*b* of the guide channel 49 of the first side wall 44 is communicated with the first aperture 50*a* of the guide channel 49 of the notch forming side wall 47 via a communicating passage 52. As shown in FIGS. 6(*b*) and 6(*c*), the second aperture 50*b* of the guide channel 49 of the notch forming side wall 47 is communicated with the first aperture 50*a* of the guide channel 49 of the second side wall 45 via a communicating passage 52. Therefore, all guide channels 49 of three side walls 44–46 and the notch forming side wall 47 in the lower mold part 40 are interconnected via the communicating passages 52.

As shown in FIG. 6(*d*), the inlet opening 51*a* for supplying the lubricating oil is formed in the outer surface 46*b* of the third side wall 46 near the end of the third side wall 46. The inlet opening 51*a* is communicated with the first aperture 50*a* of the third side wall 46 via a communicating passage 52. As shown in FIG. 6(*c*), the recovery opening 51*b* for recovering the lubricating oil is formed in the outer surface 45*b* of the second side wall 45 near the end of the second side wall 45. The recovery opening 51*b* is communicated with the second opening 50*b* of the second side wall 45 via a communicating passage 52.

Again, as shown in FIG. 5, a surface that is defined by front walls of the separate blocks 42*a*, 42*b* of the pressing surface 42 constitutes a first engaging surface B1. The inner surface of the second side wall 45 constitutes a second engaging surface B2. The inner surface of the second side wall 45 constitutes a third engaging surface B3. The inner surface of the first side wall 44 constitutes a fourth engaging surface B4. The inner surface 47*a* of the notch forming side wall 47 constitutes a fifth engaging surface B5.

A pressing apparatus 71 that includes the mold described herein will now be described. Although, in practice, a plurality of the pressing apparatuses 71 are arranged, only one of the pressing apparatuses 71 will be described in this embodiment.

Figure 10:
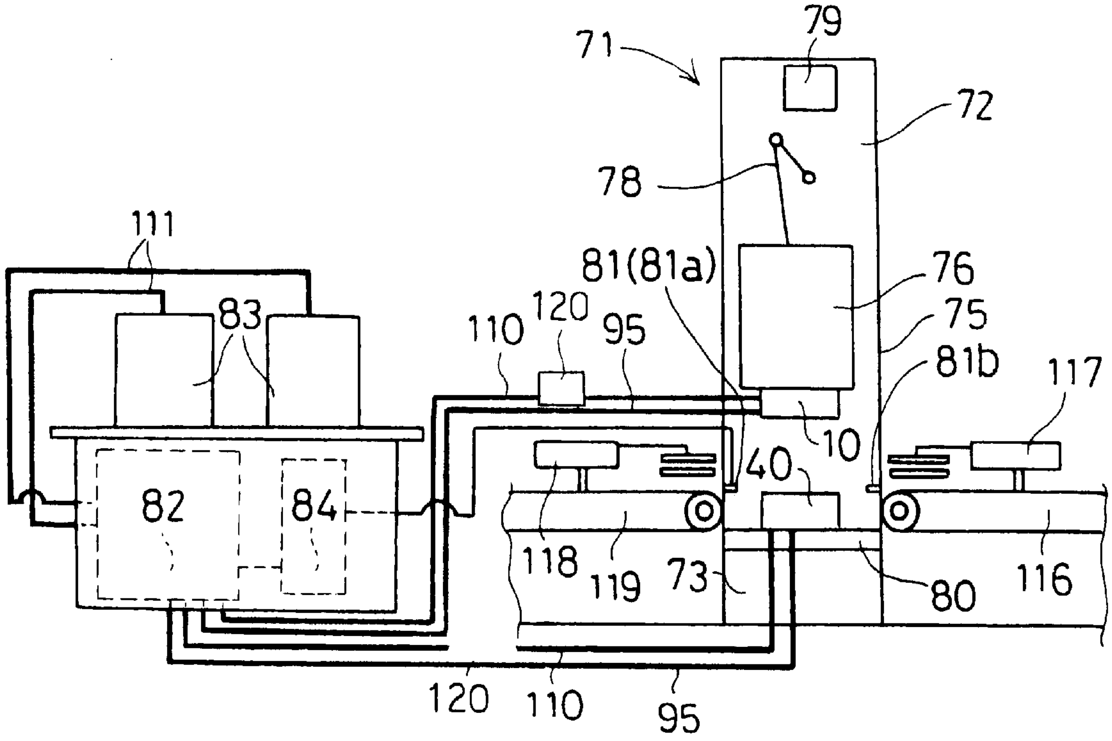
FIG. 10 is a schematic view of a pressing apparatus according to an embodiment of the present invention.

As shown in FIG. 10, a main body 75 of the pressing apparatus 71 includes a frame 72 and a main table 73 that supports the frame 72. A slide 76 is arranged in the frame 72. The slide 76 is guided by a guide (not shown) to move from an upper retracted position to a lower pressing position. The slide 76 is driven by a crank device 78.

The crank device 78 is, in turn, driven by a motor 79 arranged at the top of the frame 72. The pressing means is constituted by the crank device 78 and the motor 79. A bolster 80 acting as a retaining means is arranged on the top of the main table 73. The upper mold part 10 of the mold is fixed to a lower surface of the slide 76, and the lower mold part 40 is fixed to a top surface of the bolster 80. The pressing surfaces 12, 42 are opposed with each other. In a moving path of the upper mold part 10, an optical sensor 81 acting as a detecting means is attached to the frame 72. The optical sensor 81 includes a light projecting element 81*a* and a light receiving element 81*b*.

The pressing means is made of the slide 76, the crank device 78, the motor 79 and a control device 84.

Figure 13:
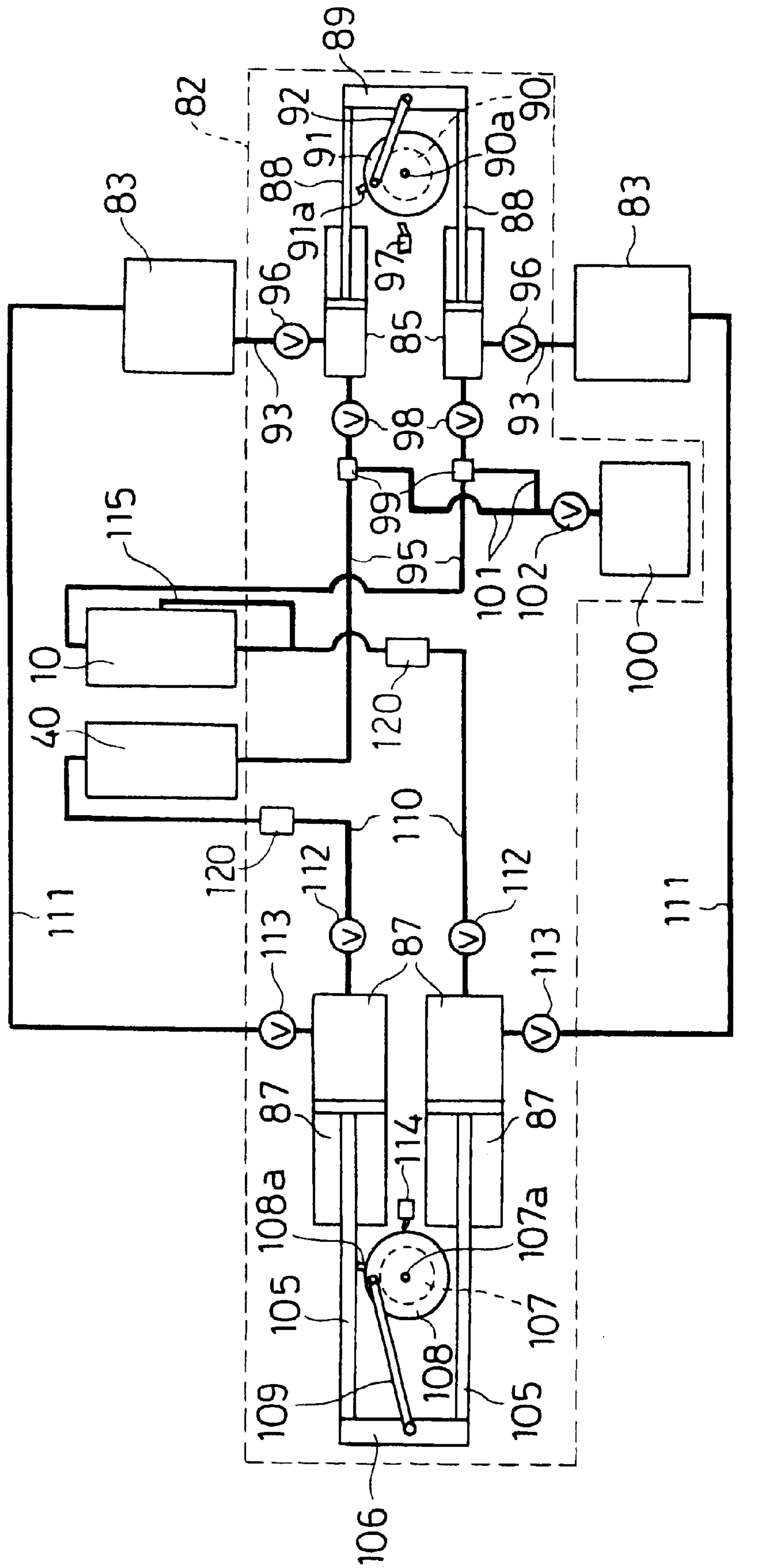
FIG. 13 is a descriptive view of a lubricating oil supplying mechanism and an air suctioning and lubricating oil recovering mechanism.

As shown in FIG. 10, a pressure oil supplying device 82, which acts as a suctioning means and also as a lubricant supplying means, lubricating oil tanks 83 and the control device 84 are provided for the pressing apparatus 71. The pressure oil supplying device 82 will now be described with reference to FIG. 13.

The pressure oil supplying device 82 includes two supplying cylinders 85, which supply the lubricating oil to the upper and lower mold parts 10, 40, and two suctioning cylinders 87, which suction the air in the cavity C and recover the lubricating oil from the upper and lower mold parts 10, 40. Operation of supplying the lubricant oil to the upper and lower mold parts 10, 40 will be first described.

Base ends of piston rods 88 of two supplying cylinders 85 are interconnected by a connecting plate 89. A rotatable crank plate 91 is arranged between the piston rods 88. A motor 90 is placed adjacent to the crank plate 91. A distal end of an output shaft 90*a* of the motor 90 is fixed to a center of the crank plate 91. A base end of a connecting lever 92 is rotatably connected to the crank plate 91 at a position offset from the center of the crank plate 91. A distal end of the connecting lever 92 is rotatably connected to a center of the connecting plate 89. Therefore, when the connecting lever 92 pushes the connecting plate 89 as the crank plate 91 is rotated by the output shaft 90*a* of the motor 90, both piston rods 88 are pulled backward. When the crank plate 91 is further rotated, the connecting lever 92 pulls the connecting plate 89, so that both piston rods 88 are pushed forward.

A limit switch 97 is arranged adjacent to the crank plate 91. The limit switch 97 is triggered by a dog 91*a* that is attached to a circumference of the crank plate 91 for detecting a rotational position of the crank plate 91.

Each supplying cylinder 85 and the inlet opening 17*a*, 51*a* of the corresponding upper or lower mold part 10, 40 are interconnected by an oil supplying hose 95. Backward movement of the piston rods 88 causes the lubricating oil to flow from each lubricating oil tank 83 to the corresponding supplying cylinder 85 through a feeding hose 93. The lubricating oil in each supplying cylinder 85 is fed into the corresponding oil supplying hose 95 by the forward movement of the piston rod 88. A first check valve 96, which restricts back flow of the lubricating oil from the cylinder 85, is arranged in each feeding hose 93.

A second check valve 98 is arranged in each feeding hose 95. The second check valve 98 allows flow of the lubricating oil toward the corresponding upper or lower mold part 10, 40 while a solenoid of the second check valve 98 is magnetized. The second check valve 98 disallows flow of the lubricating oil toward the corresponding upper or lower mold part 10, 40 while the solenoid of the second check valve 98 is demagnetized. A venturi tube 99 is arranged in each oil supplying hose 95 downstream of the second check valve 98. Each venturi tube 99 is interconnected with an air pump 100 by an air hose 101. A flow rate of the lubricating oil (also introduced air) in each oil supplying hose 95 is accelerated by the venturi tube 99. A third check valve 102 is arranged in the air hose 101 between a junction of two air hoses 101 and the air pump device 100. The third check valve 102 allows flow of air from the air pump 100 to the oil supplying hoses 95 while a solenoid of the third check valve 102 is magnetized. Furthermore, the third check valve 102 disallows the flow of air from the air pump 100 to the oil supplying hoses 95 while the solenoid of the third check valve 102 is demagnetized. The solenoid of the third check valve 102 is magnetized or demagnetized synchronously with magnetization or demagnetization of the solenoid of the second check valve 98. Therefore, as the lubricating oil is supplied to the upper and lower mold parts 10, 40, air is simultaneously introduced to promote quick supply of the lubricating oil.

An air suctioning mechanism for suctioning air from the cavity C and a lubricating oil recovering mechanism for recovering the supplied lubricating oil from the upper and lower mold parts 10, 40 will now be described.

An inner diameter and a stroke of each suctioning cylinder 87 are greater than those of the supplying cylinders 85. Base ends of piston rods 105 of two suctioning cylinders 87 are interconnected by a connecting plate 106. A rotatable crank plate 108 is arranged between the piston rods 105. A motor 107 is placed adjacent to the crank plate 108. A distal end of an output shaft 107*a* of the motor 107 is fixed to a center of the crank plate 108. A base end of a connecting lever 109 is rotatably connected to the crank plate 108 at a position offset from the center of the crank plate 108. A distal end of the connecting lever 109 is rotatably connected to a center of the connecting plate 106.

Therefore, when the connecting lever 109 pushes the connecting plate 106 as the crank plate 108 is rotated by the output shaft 107*a* of the motor 107, both piston rods 105 are pulled backward. When the crank plate 108 is further rotated, the connecting lever 109 pulls the connecting plate 106, so that both piston rods 105 are pushed forward.

A limit switch 114 is arranged adjacent to the crank plate 108. The limit switch 114 is triggered by a dog 108*a* that is attached to a circumference of the crank plate 108 for detecting a rotational position of the crank plate 108.

Each suctioning cylinder 87 and the recovery opening 17*b*, 51*b* of the corresponding upper or lower mold part 10, 40 are interconnected by a suctioning hose 110. A strainer 120 is provided in each suctioning hose 110. The strainer 120 removes clay residues in the lubricating oil that is recovered from the corresponding upper or lower mold part 10, 40. A bypass suctioning hose 115, which extends from the connector 31 arranged in the back surface of the upper mold part 10, is connected to the suctioning hose 110 of the upper mold part 10.

Each suctioning cylinder 87 and the corresponding lubricating oil tank 83 are interconnected by an oil recovery hose 111. The lubricating oil, which is introduced into the suctioning cylinder 87 from the upper or lower mold part 10, 40 through the suctioning hose 110 by the backward movement of the piston rod 105, is then supplied to the corresponding oil recovery hose 111 and to the corresponding lubricating oil tank 83 by the forward movement of the piston rod 105.

A fourth check valve 112 is provided in each suctioning hose 110. The fourth check valve 112 allows flow of the lubricating oil from the corresponding upper or lower mold part 10, 40 while a solenoid of the fourth check valve 112 is magnetized. Furthermore, the fourth check valve 112 disallows the flow of the lubricating oil from the upper or lower mold part 10, 40 while the solenoid of the fourth check valve 112 is demagnetized. A fifth check valve 113, which restricts back flow of the lubricating oil from the cylinder 86, is arranged in each recovering hose 111.

The control device 84 controls the entire pressing apparatus 71. The control device 84 is connected to motors 90, 107 of the pressure oil supplying device 82, the first to third check valves 99, 102, 112 and the air pump 100 to control them. The control device 84 is further connected to the light receiving element 81*b* of the optical sensor 81 and counts the number of signals transmitted from the light receiving element 81*b*. In this embodiment, the control device 84 activates the motors 90, 107 once every five counts of the signals (that is every five pressing operations). Furthermore, the control device 84 is connected to the limit switches 97, 114 and controls operating time period and timing of the motors 90, 107 based on the signals transmitted from the limit switches 97, 114.

As shown in FIG. 10, a belt conveyer 116 for conveying the preform and a supply robot 117 for supplying the preform to the lower mold part 40 are arranged upstream of the pressing apparatus 71. A removal robot 118 for removing the raw roof tile from the lower mold part 40 after the pressing operation and a belt conveyer 119 for conveying the roof tile are arranged downstream of the pressing apparatus 71.

Operation of thus constructed pressing apparatus 71 will now be described. In an initial state, the piston rods 88 of the supplying cylinder 85 and the piston rods 105 of the suctioning cylinder 87 are at the right end positions in FIG. 13.

The motor 79, the pressure oil supplying device 82, the control device 84, the air pump 100 and the second check valve 98 are now brought into the operating state by supply of power. The operation starts when the control switch (not shown) is switched on. The motor 79 is driven to move the slide 76 of the pressing apparatus 71 upward from its initial position via the crank device 78. An up-front preform on the belt conveyer 116 is displaced to the pressing surface 42 of the lower mold part 40 by the supply robot 117. The motor 79 is then driven synchronously with the displacement of the preform onto the lower mold part 40 to move the slide 76 downward by the crank device 78. When the slide 76 is moved downward and crosses the light ray transmitted from the light projecting element 81*a* to the light receiving element 81*b*, the optical sensor 81 detects this interruption. The optical sensor 81 transmits an output signal indicating the detection of the interruption to the control device 84. The control device 84 activates the fourth check valve 112 based on the output signal of the optical sensor 81.

Figure 8:
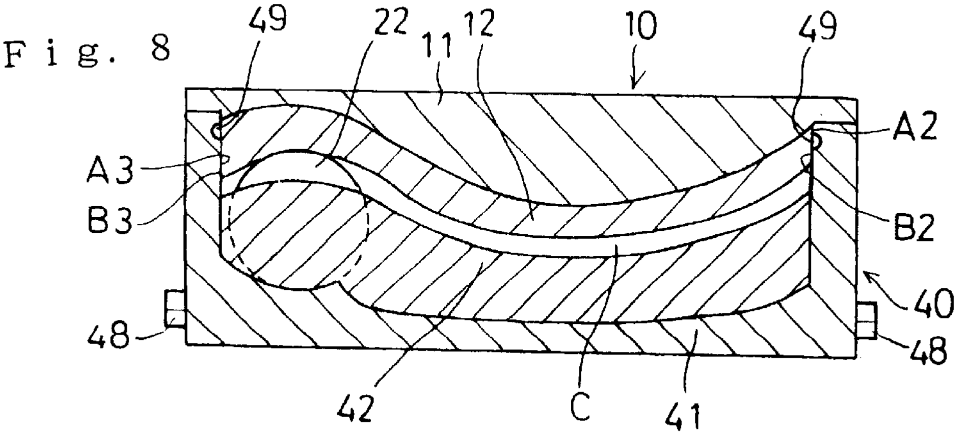
FIG. 8 is a cross-sectional view along line A—A in FIG. 7.
Figure 9:
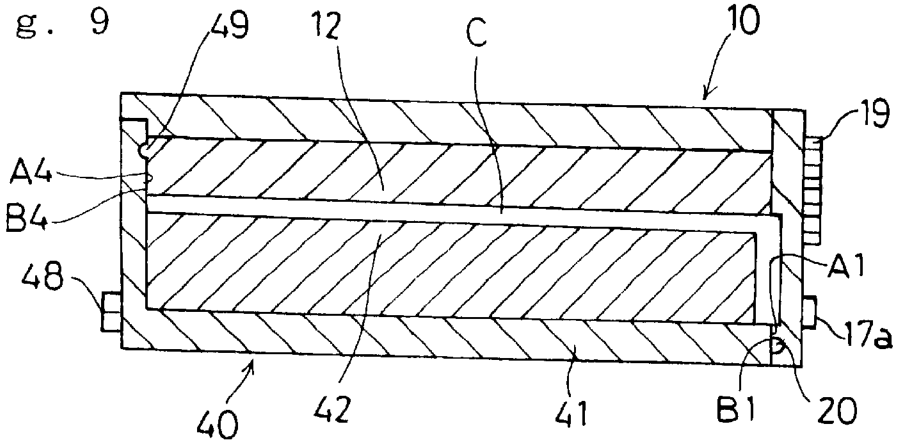
FIG. 9 is a cross-sectional view along line B—B in FIG. 7.

The upper mold part 10 moves downward, and the engagement between the upper and the lower mold parts 10, 40 begins. As the upper mold part 10 moves downward, the engaging surfaces A1, A2, A3, A4, A5 of the upper mold part 10 engage with the engaging surfaces B1, B2, B3, B4, B5 of the lower mold part 40, respectively, as shown in FIGS. 8 and 9. At this point, the closed cavity C is formed between the upper and lower mold parts 10, 40.

At the same time, the control device 84 drives the motor 108 to move the piston rods 105 of both suctioning cylinders 87 backward. Simultaneously, the fourth check valve 112 is activated. Therefore, negative pressure is developed in both suctioning hoses 110, so that air is suctioned through a gap between the poppet 28 and the cylindrical housing 27 and then through the connector 31 and the bypass suctioning hose 115.

As the upper mold part 10 moves further downward, the guide channel 20 in the side wall 16 of the upper mold part 10 is covered by the engaging surface B1. While the guide channel 20 is entirely covered by the engaging surface B1, the guide channel 20 forms a tunnel that is communicated with outside of the mold only through the first and second apertures 21*a*, 21*b*. Likewise, the guide channels 49 of the first to third side walls 44–46 and the notch forming side wall 47 of the lower mold part 40 are also covered by the corresponding engaging surfaces A2–A5.

While the guide channel 49 is entirely covered by the engaging surface B1, all guide channels 49 of the first to third side walls 44–46 and the notch forming side wall 47 of the lower mold part 40 are connected together to form one continuous tunnel. This continuous tunnel is communicated with outside of the mold only through the first aperture 50*a* of the third side wall 46, which is directly communicated with the inlet opening 51*a*, and the second aperture 50*b* of the second side wall 45, which is directly communicated with the recovery opening 51*b*. In this state, air in the cavity C is suctioned through the connector 31 and the bypass suctioning hose 115. Furthermore, air is suctioned from small gaps between the engaging surfaces A1–A5 and the engaging surfaces B1–B5 through both suctioning hoses 110.

While the guide channels 20, 49 forms the tunnels in a manner described above, the control device 84 drives the motor 90 to move the piston rods 88 of both supplying cylinders 85 forward. At the same time, the first and second check valves 98, 102 are activated. Therefore, the pressure oil (the lubricating oil) flows from the inlet opening 17*a*, 51*a* of respective upper or lower mold part 10, 40 to the corresponding guide channel(s) 20, 49 through the corresponding first aperture 21*a*, 50*a*. During this process, air that is supplied form the air pump 100 is accelerated by the venturi tubes 99, so that the lubricating oil can be quickly introduced into each inlet opening 17*a*, 51*a*. As the lubricating oil flows into the guide channels 20, 49, the upper mold part 10 continues to move downward, so that the lubricant oil in guide channels 20, 49 is spread between the engaging surfaces A1–A5 of the upper mold part 10 and the engaging surfaces B1–B5 of the lower mold part 40 to lubricate the engaging surfaces A1–A5 and B1–B5 (the lubrication could be further promoted by the penetration of the lubricating oil by capillary action). The control device 84 stops the motor 90 when the piston rods 88 reach the forward end position (at the right side in FIG. 13) based on the detected signal from the limit switch 97.

The lubricating oil that is introduced into each guide channel 20, 49 does not stay in the guide channel 20, 49 and is suctioned into the corresponding suctioning cylinder 87 by the action of the suctioning cylinder 87. The suctioning cylinder 87, which is now switched from the suctioning operation to the discharging operation, feed the lubricating oil in the suctioning cylinder 87 into the oil recovery hose 111. The control device 84 stops the motor 107 when the piston rods 105 reach the forward end position (at the right side in FIG. 13) based on the detected signal from the limit switch 114.

Figure 7:
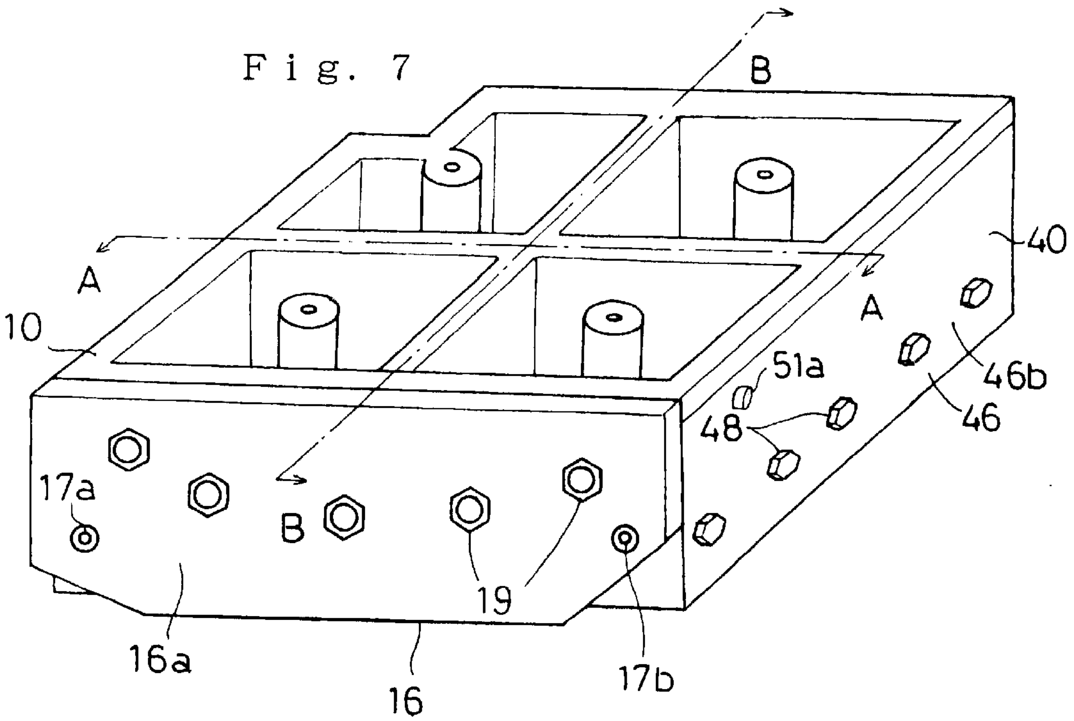
FIG. 7 is a perspective view showing the upper and lower mold parts assembled together.

As described above, the upper mold part 10 that is fixed to the lower surface of the slide 76 moves downward and engages the lower mold part 40, as shown in FIGS. 7–9, to press the preform while the lubricating oil is supplied between the engaging surfaces A1–A5 and the engaging surfaces B1–B5. Since the guide channels 20, 49 extend in a lateral direction for a relatively long range, the lubricating oil can be widely supplied between the engaging surfaces A1–A5 and the engaging surfaces B1–B5 while they are engaged together. Therefore, the frictional resistance between the engaging surfaces A1–A5 and the engaging surfaces B1–B5 are effectively reduced by the lubricating oil. Furthermore, the lubricating oil that is introduced into each guide channel 20, 49 is recovered through the oil recovery hose 96, so that excess lubricating oil is not spilled and, therefore, is not wasted. Furthermore, the preform is not pressed by the residual air in the cavity C, so that there will be no problem of deforming the preform.

The preform is molded and changes its shape in conformity with the internal shape of the cavity C. As the upper mold part 10 moves further downward, the poppet 28 is pressed backward by the preform, so that the front end surface of the head 30 of the poppet 28 becomes flush with the pressing surface 12, as shown in FIG. 12(*b*). Therefore, the poppet 28 does not leave any undesired imprint on the surface of the preform.

Thereafter, the crank device 78 is driven to move the slide 76 upward. The molded raw roof tile 1 is left on the pressing surface 42 of the lower mold part 40. The removal robot 118 removes the roof tile 1 from the lower mold part 40 and places it onto the belt conveyor 119. Then, the supply robot 117 places the next preform onto the pressing surface 42 of the lower mold part 40, and the pressing operation is repeated.

During a series of such pressing operations, the optical sensor 81 detects the number of the reciprocations of the slide 76 in a vertical direction. The control device 84 counts the number of the reciprocations of the slide 76 based on the detected signals that are transmitted from the light receiving element 81*b* of the optical sensor 81. In this embodiment, each motor 90, 107 is driven once every five reciprocations of the slide 76, that is every five productions of the molded raw roof tiles 1.

The above described embodiment provides the following advantages.

(1) During the pressing operation, although the engaging surfaces A1–A5 of the upper mold part 10 and the engaging surfaces B1–B5 of the lower mold part 40 are engaged with each other, presence of the lubricating oil between them reduces the frictional resistance and allows smooth pressing operation, minimizing wearing of the engaging surfaces A1–A5 and B1–B5. Furthermore, even if the clay is held between the engaging surfaces A1–A5 and B1–B5, the lubricating action of the lubricating oil minimizes scratching of the engaging surfaces A1–A5 and B1–B5 by the clay.

(2) Excess lubricating oil is recovered from the recovery opening 51*b* to prevent excess supply of the lubricating oil to the engaging surfaces A1–A5 and B1–B5, so that the pressing surface 42 and the surroundings of the lower mold part 40 are not soaked with the lubricating oil, and also the lubricating oil is not mixed with press oil of the pressing apparatus. The lubricating oil that is recovered into the lubricating oil tank 83 can be recycled to reduce the cost of the lubricating oil and to provide the pressing apparatus that does not waste the resource and reduces the environmental problems.

(3) All guide channels 49 of three side walls 44–46 and the notch forming side wall 47 in the lower mold part 40 are connected together via the communicating passages 52 in the lower mold part 40. The guide channels 49 form one continuous tunnel passage when the upper mold part 10 is lowered and the engaging surfaces A2–A5 cover the corresponding guide channels 49. Since only one inlet opening 51*a* and one recovery opening 51*b* are needed, the construction is relatively simple, and the number of required pipes is reduced. As a result, a manufacturing cost is reduced. Furthermore, the relatively simple construction provides an advantage of minimizing occurrence of problems such as malfunctioning.

(4) In one course, the air in the closed cavity C is suctioned into the suctioning hoses 110 through small gaps between the engaging surfaces A1–A5 and the engaging surfaces B1–B5. In another course, the air in the closed cavity C is suctioned into the bypass suctioning hose 115 through the communicating hole 26 and the connector 31. Through these courses, the air is quickly discharged as the upper mold part 10 is lowered, so that a pressing rate is not reduced, and deformation of the preform due to the residual air can be restricted.

(5) When the upper mold part 10 is lowered and only slightly touches the lower mold part 40, the tunnels are not formed yet by the guide channels 20, 49, so that the air in the cavity C cannot escape through the tunnels. However, the air in the cavity C can be suctioned through the connector 31, so that the preform will not be deformed by the residual air.

(6) The head 30 of the poppet 28 is protruded from the pressing surface 12 while the preform is away from the pressing surface 12, so that the air can be discharged through the gap between the poppet 28 and the cylindrical housing 27. As the pressing operation further proceeds, the poppet 28 is pushed backward into the cylindrical housing 27 by the preform, and the front end surface of the head 30 becomes flush with the pressing surface 12, such that no impression is produced on the preform by the poppet 28, resulting in a smooth raw roof tile 1.

(7) The lubricant cannot be supplied unless each guide channel 20, 49 reaches the corresponding engaging surface and forms the tunnel. However, the air in the cavity C is preferably discharged right after the upper mold part 10 touches the lower mold part 40 since the preform could be deformed as the pressure in the cavity C is increased. In the embodiment described above, the timing for initiating the suction of the air is scheduled earlier than the timing for supplying the lubricant in order to provide more efficient discharge of the air. The time difference between these timings can be readily adjusted by changing the position of respective dog 91*a*, 108*b* that triggers the corresponding limit switch 97, 114, which turns on and off the corresponding motor 90, 107.

(8) The lubricating oil is supplied once every five reciprocations of the upper mold part 10, so that the appropriate amount of the lubricating oil can be supplied.

(9) The lubricating oil is spread laterally when the lubricating oil is guided through the guide channels 20, 49, so that the lubricating oil can be evenly supplied to each engaging surface A1–A5, B1–B5.

(10) If the lubricating oil is adhered to the surfaces of a raw roof tile to which glaze is applied, the glaze is repelled by the lubricating oil. Therefore, it is desired to prevent flow of the lubricating oil to these surfaces of the raw roof tile. For example, in FIG. 10, it is desired to keep the lug 3, the eave end side 4 and a top surface 5 of the raw roof tile 1 away from the lubricating oil. In the above embodiment, the lubricating oil is supplied to the first engaging surface A1 of the upper mold part 10, and the guide channel 20 in the first engaging surface A1 is always placed below the lug 3 and the eave end side 4, so that the lubricating oil that is flown out from the guide channel 20 does not adhere to the lug 3 and the eave end side 4.

Furthermore, the lubricating oil is supplied to the second to fifth engaging surfaces B2–B5 of the lower mold part 40, and the guide channels 49 for supplying the lubricant oil to these engaging surfaces B2–B5 are arranged below the top surface 5 of the raw roof tile 1, so that the lubricating oil that is flown out from each guide channel 49 does not adhere to the top surface 5.

The present invention can be embodied in the following modified forms.

The communicating hole 26 can be eliminated, and the air can be suctioned only via the engaging surfaces A1–A5, B1–B5. In this case, the guide channels 20, 49 can be eliminated, and a hole for supplying the lubricating oil and for suctioning the air can be directly formed in respective engaging surface A1–A5, B1–B5.

In the above embodiment, although the supply of the lubricating oil to the feeding hose 93 is conducted through the motor 90 and the rotatable crank plate 91, other means can be used in place of the motor 90 and the rotatable crank plate 91.

In the above embodiment, the poppet 28 acting as the valve member arranged in the communicating hole 26 is designed to move backward into its cylindrical housing. However, the poppet 28 does not necessarily move backward in a manner described above. The poppet 28 may only function to suction the air.

The position and size of the communicating hole 26 can be changed to any position and size, and more than one communicating hole 26 can be provided.

The lubricating oil supplying mechanism and the air suctioning and lubricant oil recovering mechanism in the above embodiment is merely one example and can be designed to any form.

In the above embodiment, although the first and second apertures 21*a*, 50*a*, 21*b*, 50*b* are arranged in the engaging surfaces having the guide channels 49, the first and second apertures 21*a*, 50*a*, 21*b*, 50*b* can be alternatively provided in the engaging surfaces A2–A5 and B1 that are opposed to the engaging surfaces having the guide channels 49. With this construction, the lubricating oil can still flow from the first and second apertures 21*a*, 21*b*, 50*a*, 50*b* through the guide channels 49 when the guide channels 49 form the tunnel.

In the above embodiment, for example, the guide channel 49 in the inner surface 44*a* of the first side wall 44 of the lower mold part 40 extends linearly in a lateral direction. This can be altered to form a guide channel that extends two dimensionally in the inner surface of the side wall 120. With this construction, the lubricating oil can be quickly spread and can be evenly supplied.

In the above embodiment, although the guide channels 49 in all three side walls 44–46 of the lower mold part 40 are interconnected via the communicating passages 52, each guide channel 49 can be separated from other guide channels 49.

In the above embodiment, the first and second apertures 21*a*, 50*a*, 21*b*, 50*b* are respectively provided at the opposing ends of the respective guide channels 20, 49. This arrangement is effective for evenly filling the lubricating oil throughout a relatively long range in the guide channels 20, 49. The first and second apertures 21*a*, 50*a*, 21*b*, 50*b* are not necessarily positioned at the ends of the guide channels 20, 49 and can be arranged at any positions in the guide channels 20, 49.

The lubricating oil is preferably recovered into the lubricating oil tanks 83. However, the lubricating oil can be discharged through the recovery openings 17*b*, 51*b* without recovering it into the lubricating oil tanks 83 for recycling. This can provide enough advantage for preventing mixing of the press oil with the lubricating oil.

In the above embodiment, the upper mold part 10 has one side wall 16, and the lower mold part 40 has three side walls 44–46. This arrangement is designed to prevent the lubricating oil, which runs downward in a manner described above, to adhere to the lug 3 and others. The arrangement of the side walls is not necessarily limited to this. For example, four side walls that respectively have a guide channel 49 in its inner surface can be arranged in the lower mold part 40. In this case, the guide channels are not necessarily interconnected via the communicating passages 52 and, hence, can be separated from each other.

This invention can be applied to any roof tiles besides the eave end roof tiles. Furthermore, this invention can be applied to any press works besides the press works of the roof tiles as long as the press works involve the mold parts, which have the engaging portions.

The timing for driving the pressure oil supplying device 82 of the above embodiment can be changed to any appropriate one.

In the above embodiment, although the contactless optical sensor 81 is used as the detecting means, other alternative means can be used.

The present invention can be applied to any molds having engaging portions besides the roof tile molds. The lubricant is not necessarily the lubricating oil and could be mold releasing agent, water or any other agent. The present invention may be modified within the scope of the invention.

What is claimed is:

1. A mold comprising first and second mold parts, wherein the first and second mold parts respectively have an engaging surface for engaging with each other during a pressing operation of molding material and a pressing surface for pressing the molding material, the mold being characterized by:

a lubricant supplying element that is formed in the engaging surface of at least one of the first and second mold parts for supplying lubricant to the engaging surface;

a first communicating passage that is formed in at least one of the first and second mold parts and is communicated with the lubricant supplying element;

an inlet opening that is formed in an outer surface of the mold part having the first communicating passage for supplying the lubricant to the lubricant supplying element through the first communicating passage;

a second communicating passage that is formed in at least one of the first and second mold parts and is communicated with the lubricant supplying element; and an outlet opening that is formed in an outer surface of the mold part having the second communicating passage for discharging the lubricant from the mold through the second communicating passage.

2. A mold comprising first and second mold parts, wherein the first and second mold parts respectively have an engaging surface for engaging with each other during a pressing operation of molding material and a pressing surface for pressing the molding material, the mold being characterized by:

a lubricant supplying channel that is formed in the engaging surface of the first or second mold part for supplying lubricant to the engaging surface;

a first communicating passage that is formed in the first or second mold part and is communicated with the channel;

an inlet opening that is formed in an outer surface of the mold part having the first communicating passage for supplying the lubricant to the channel through the first communicating passage;

a second communicating passage that is formed in the first or second mold part and is communicated with the channel; and an outlet opening that is formed in an outer surface of the mold part having the second communicating passage for discharging the lubricant from the mold through the second communicating passage.

3. A mold according to claim 2, characterized in that the first communicating passage is formed in the mold part having the channel.

4. A mold according to claim 2, characterized in that the second communicating passage is formed in the mold part having the channel.

5. A pressing apparatus including:

a mold comprising first and second mold parts, wherein the first and second mold parts respectively have an engaging surface for engaging with each other during a pressing operation of molding material and a pressing surface for pressing the molding material;

a pressing means for holding the first and second mold parts of the mold and pressing the molding material that is disposed between the first and second mold parts by moving the first and second mold parts toward each other; and a counting means for counting the number of the pressing operations, the pressing apparatus being characterized by:

a lubricant supplying element that is formed in the engaging surface of at least one of the first and second mold parts for supplying lubricant to the engaging surface;

a first communicating passage that is formed in at least one of the first and second mold parts and is communicated with the lubricant supplying element;

an inlet opening that is formed in an outer surface of the mold part having the first communicating passage for supplying the lubricant to the lubricant supplying element through the first communicating passage;

a supplying device for supplying the lubricant to the inlet opening; and a control means for operating the supplying device based on a predetermined count of the counting means and a predetermined timing.

6. A pressing apparatus according to claim 5, characterized by:

a second communicating passage that is formed in at least one of the first and second mold parts and is communicated with the lubricant supplying element;

an outlet opening that is formed in an outer surface of the mold part having the second communicating passage for discharging the lubricant from the mold through the second communicating passage.

7. A pressing apparatus according to claim 5, characterized in that the lubricant supplying element is a lubricant supplying channel.

8. A pressing apparatus including:

a mold comprising first and second mold parts, wherein the first and second mold parts respectively have an engaging surface for engaging with each other during a pressing operation of molding material and a pressing surface for pressing the molding material;

a pressing means for holding the first and second mold parts of the mold and pressing the molding material that is disposed between the first and second mold parts by moving the first and second mold parts toward each other; and a counting means for counting the number of the pressing operations, the pressing apparatus being characterized by:

a lubricant supplying channel that is formed in the engaging surface of the first or second mold part for supplying lubricant to the engaging surface;

a first communicating passage that is formed in the first or second mold part and is communicated with the channel;

an inlet opening that is formed in an outer surface of the mold part having the first communicating passage for supplying the lubricant to the channel through the first communicating passage;

a second communicating passage that is formed in the first or second mold part and is communicated with the channel;

an outlet opening that is formed in an outer surface of the mold part having the second communicating passage for discharging the lubricant from the mold through the second communicating passage;

a supplying device for supplying the lubricant to the inlet opening; and a control means for operating the supplying device based on a predetermined count of the counting means and a predetermined timing.

9. A pressing apparatus according to claim 8, characterized in that the first communicating passage is formed in the mold part having the channel.

10. A pressing apparatus according to claim 8, characterized in that the second communicating passage is formed in the mold part having the channel.

11. A pressing apparatus according to claim 8, characterized by a discharging device that is connected to the outlet opening for discharging the lubricant and air in a cavity, which is formed between the first and second mold parts when the first and second mold parts are engaged together, from the mold, wherein the control means operates the discharging device based on a predetermined count of the counting means and a predetermined timing.

12. A pressing apparatus according to claim 11, characterized by a lubricant supply tank for storing the lubricant to be supplied to the supplying device, wherein the lubricant that is discharged from the outlet opening is returned to the lubricant supply tank.

13. A pressing apparatus according to claim 11, characterized in that the control means actuates the discharging device prior to actuation of the supplying device.

14. A pressing apparatus according to claim 12, characterized by a strainer, wherein the lubricant that is discharged from the outlet opening is returned to the lubricant supply tank via the strainer.

15. A pressing apparatus according to claim 11, characterized by:

an aperture that is formed in the pressing surface of at least one of the first and second mold parts;

a second outlet opening that is formed in an outer surface of the mold part having the aperture and is connected to the discharging device;

a third communicating passage that communicates the aperture to the second outlet opening for discharging the supplied lubricant from the mold; and a valve member disposed in the third communicating passage, wherein the valve member is normally urged toward an interior of the cavity away from the aperture to allow discharge of the air in the cavity through the second outlet opening by the discharging device, and wherein the valve member closes the third communicating passage when the valve member is pressed by the molding material and becomes flush with the corresponding pressing surface.

* * * * *